United States Patent Office 3,499,911
Patented Mar. 10, 1970

3,499,911
STABILIZATION OF A CYCLIC SULFITE AND
COMPOSITION
Jonathan E. Zakary, Grand Island, N.Y., assignor to
Hooker Chemical Corporation, Niagara Falls,
N.Y., a corporation of New York
No Drawing. Filed June 1, 1967, Ser. No. 642,732
Int. Cl. C07d 89/30
U.S. Cl. 260—327                                 9 Claims

ABSTRACT OF THE DISCLOSURE

This invention relates to the discovery of a new stabilizing agent, which may be employed with the polycyclic sulfite known by the chemical nomenclature of 6,7,8,9,10,10 - hexachloro - 1,5,5a,6,9,9a-hexahydro-6,9-methano-2,4,3-benzodioxa thiepin-3-oxide, to retard the decomposition of the polycyclic sulfite into chlorendic diol and chlorendic ether. The stabilizing agent also may be employed with the chlorendic diol resulting from the degradation of the polycyclic sulfite, in a process of reconstituting the chlorendic diol into the polycyclic sulfite by reaction with thionyl halide. In such a reconstitution process, in the absence of the newly discovered stabilizing agent, a large proportion of the chlorendic diol is converted into chlorendic ether. Because chlorendic ether is a stable product, its formation substantially reduces the yield of the polycyclic sulfite resulting from the above reconstitution process.

The stabilizer of this invention is typically a phosphorus trichloride or a phosphorus thiotrichloride.

---

This invention relates to a method of producing a high yield of a compound having the chemical nomenclature: 6,7,8,9,10,10 - hexachloro - 1,5,5a,6,9,9a-hexahydro-6,9-methano - 2,4,3 - benzodioxa thiepin-3-oxide, hereafter referred to as the polycyclic sulfite, a process for stabilizing the polycyclic sulfite, and the compositions either containing the reactant chlorendic diol from which the polycyclic sulfite is produced or alternatively containing the polycyclic sulfite itself, in combination with the stabilizing agent of this invention.

BACKGROUND

The pure polycyclic sufite is a white solid. However, as produced on a commercial scale, it may appear as a tan flake material. The chemical structure is:

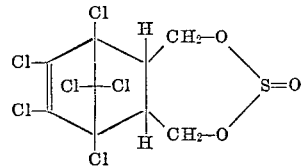

The molecular weight of the polycyclic sulfite is 407.

The polycyclic sulfite is a compound known in the art, and is well-known for its high effectiveness as an insecticide; however, it is not limited to solely this utility.

One conventional route for the preparation of the polycyclic sulfite begins by the reaction of hexachlorocyclopentadiene with cis-1,4-butene diol (of the formula $CH_2(OH)$—$CH$=$CH$—$CH_2(OH)$), in the presence of any suitable conventional acid acceptor such as epichlorohydrin for example, in a suitable solvent such as toluene for example, at a temperature sufficient to produce chlorendic diol of the formula:

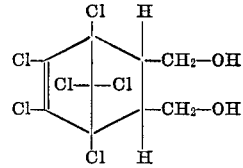

In the above reaction, the cis-butene diol is added after the acid acceptor has been previously added to the heated hexachlorocyclopentadiene. The chlorendic diol is crystallized, and recovered. Thereafter, the chlorendic diol is reacted with typically thionyl chloride in a suitable solvent such as toluene, until reaction is substantially complete. The resulting product, the polycyclic sulfite, may then be purified by the removal of excess thionyl chloride and toluene. The reaction with the thionyl chloride in the production of the sulfite normally takes place at a temperature up to about 115° C. for normally about three hours.

This invention is directed to two separate and distinct problems which may or may not be related but which nevertheless have a common solution. The first problem is to substantially overcome the instability of the sulfite and thereby prevent its ready decomposition into a major amount of chlorendic diol, and a minor amount of chlorendic ether of the formula:

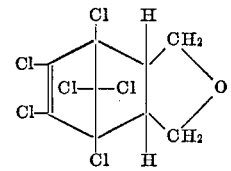

which is a highly stable product.

A second problem arises in an effort to reconvert the chlorendic diol degradation product resulting from the decomposition of the polycyclic sulfite, into the polycyclic sufite by reaction with thionyl chloride. In such a recovery reaction, which is the same as the initial reaction originally employed to produce the polycyclic sulfite, the problem is to suppress a tendency of the chlorendic diol to be converted into chlorendic ether.

Although steaming is normally effective in removing the impurities from the polycyclic sulfite, when the degraded polycyclic sulfite solution is reacted with thionyl chloride and the molten polycyclic sulfite reaction product thereof is subsequently subjected to steaming, about 76% of the chlorendic diol is converted into chlorendic ether. When a dioxane solution of the degraded polycyclic sulfite treated with Maglite (magnesium oxide) is reacted with thionyl chloride and thereafter steamed, again about 76% of the chlorendic diol is converted to chlorendic ether. When the dioxane solution treated with activated carbon is employed as a stabilizer for the degraded polycyclic sulfite solution, after the steaming step, the chlorendic diol has been reduced by about 82%, but the increase in the chlorendic ether is even greater, this being evidence of additional major deterioration of the polycyclic sulfite as well as the conversion of the diol into the ether. When the polycyclic sulfite was extracted, isolated and steamed, the final polycyclic sulfite solution contained about 11% chlorendic ether degradation product. These results in reconstituting degraded Thiodan are typically in contrast with the initial high efficiency convers of chlorendic diol to polycyclic sulfite of about 99% purity after steaming.

It is of additional interest to note that in the past it has been determined that metal chlorides such as ferric chloride, acelerate the decomposition of Thiodan into chlorendic diol and chlorendic ether, and favor the conversion of chlorendic diol into chlorendic ether, thereby making the discovery of this invention highly unexpected in nature.

Accordingly, it is an object of this invention to obtain a process for constituting a degraded polycyclic sulfite composition to a high purity.

Another object is a novel composition comprising an adduct of hexachlorocyclopentadiene and cis-2-butene-1,4-diol in combination with a novel stabilizing agent.

Another object is a novel composition comprising a polycyclic sulfite composition in combination with a novel stabilizing agent.

Other objects become apparent from the above and following disclosure.

THE INVENTION

The objects of this invention are obtained by the employment of a phosphorus halide preferably a trihalide or phosphorus thiohalide $(S=PX_3)$, and also preferably being a phosphorus thiochloride.

Accordingly, by the employment of a stabilizing amount of a phosphorus halide as a stabilizing agent such as a phosphorus trihalide, or by the employment of phosphorus thionyl halide such as a stabilizing agent such as phosphorus thionyl trichloride, in a reaction of (1) chlorendic diol compound of the formula:

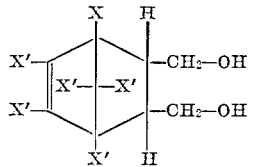

in which X is a halogen such as chlorine and bromine, preferably chlorine, with (2) a thionyl halide, preferably thionyl chloride of the formula $SOCl_2$, an unexpectedly high yield of the polycyclic sulfite is produced.

Accordingly, a composition of this invention includes the chlorendic diol in combination with the above-identified stabilizing agent of this invention for stabilizing during the process of producing the above-identified polycyclic sulfite.

Also, two other compositions of this invention comprise (1) the polycyclic sulfite in combination with (2) a member selected from the group consisting of (a) the stabilizer of this invention, i.e., a phosphorus halide of the formula: $(S)_a=P(X^2)_b$ in which $X^2$ is a halogen, in which $a$ is zero or one, and in which $b$ is 3 or 5, provided that $b$ is 3 when $a$ is one, (b) a residue of said phosphorus halide stabilizer comprising phosphoric acid, and (c) mixtures thereof. The stabilizer in combination with the polycyclic sulfite prevents degradation during storage or during subjection of the polycyclic sulfite to other degrading conditions such as the steaming. The stabilizer appears to degrade under degradation conditions such as during steaming, for example, into a residue of phosphorus, normally in a form comprising about 50 p.p.m. of phosphoric acid, for example.

In each embodiment of this invention, the preferred embodiments employ chlorine as the halogen of the stabilizing agent. Also, phosphorus thionyl halide is preferred to the phosphorus halide.

It should be noted that although this invention is directed primarily to the improvement of the regeneration of the degenerated polycyclic sulfite solution and in the improved stability of the polycyclic sulfite to steaming. This invention also obviously may be advantageously employed with a diol initially produced and employed as a reactant for the initial production of the polycyclic sulfite.

The stabilizer is preferably employed in an amount up to about 0.5% by weight as based upon the weight of the diol compound being reacted or as based on the weight of the polycyclic sulfite being stabilized. The only limitations on the maximum amount of stabilizer are practical considerations such as cost, contamination, and the like.

In the process of converting chlorendic diol reactant to the polycyclic sulfite product by reaction with a thionyl halide such as thionyl chloride in an amount up to about 50% based on the weight of diol employed, conventional operating temperatures and other reaction conditions and stabilizers may be employed. In a preferred process of this invention, the thionyl chloride is employed in a large excess, above the stoichiometric amount necessary in contrast to merely a small excess of thionyl halide, thereby to obtain a preferred higher yield of the polycyclic sulfite product. Typically, using the conversion of chlorendic diol to polycyclic sulfite for example, about 0.832 mole of the diol, i.e., about 300 grams of chlorendic diol, is placed in a reaction container, and a solvent such as toluene is added in an amount of about 150 milliliters, for example, and the chlorendic diol is admixed therewith. Thereafter, the stabilizing agent of this invention preferably is added normally at this point in the process. Although the stabilizing agent of this invention may be added substantially simultaneously with the thionyl chloride, in the preferred embodiment the stabilizing agent is added at some point prior to the addition of the reactant such as thionyl halide, i.e., the thionyl chloride. The thionyl chloride is added in an amount of about 1.66 moles, i.e., about 121 milliliters of the thionyl chloride, to the slurry of chlorendic diol at about room temperature over a period of normally about 30 minutes; a slow rate of addition is preferred for good results because of a high degree of foaming caused by the addition. The mixture is then heated to a temperature of preferably about 100 to about 115 degrees centigrade for a period of normally about two to four hours or more. Excess thionyl halide and solvent are substantially distilled off. The polycyclic sulfite is steamed also, in the presence of the stabilizer, thereby preventing degradation. More particularly, the polycyclic sulfite reaction product of the process is preferably cooled to about room temperature, filtered to remove foreign particles, and thereafter stripped, preferably at a final reaction vessel temperature and pressure of about 150° C./12 millimeters of mercury, the residue is steamed, and is preferably thereafter cast.

Although chlorine is the preferred halogen for each of the reaction ingredients and products employed in this invention, such as for the diol halogen substituents, for the halogen of the thionyl halide, for the halogen of the polycyclic sulfite compound, and for the stabilizer, other halogens such as typically bromine, for example, are within the scope of the invention.

Also, although the above illustrations made reference solely to toluene as a solvent and diluent, other typical solvents or diluents that may be employed include aromatics such as benzene, chlorobenzene, xylene, and mixtures thereof, for example. Because toluene dissolves the polycyclic sulfite but does not dissolve chlorendic diol and the reaction solution therefore is a clear liquid, toluene is a preferred solvent.

The following examples are intended solely to illustrate the invention described herein, and are not intended in any manner to limit the scope of this invention except insofar as the appended claims are limited. All percentages are based on weight and all temperatures are expressed in degrees centigrade, unless otherwise specifically stated.

Examples 1–6

For each of Examples 1 through 6 a similar procedure was followed. In each example, the stabilizing agent was added to the reactor vessel before mixing with the thionyl chloride. In each example, about 250 grams of degraded polycyclic sulfite was admixed with the stabilizing agent, and thereafter with 80 grams of thionyl chloride, employing about 150 milliliters of toluene and thereafter reacted for a period of about four hours at about 100 degrees centigrade. Thereafter for each example, the toluene and unreacted thionyl chloride were removed by vacuum distillation at about 190 mm. Hg and about 100 degrees centigrade. The reaction product for each example was air-blown for about one hour at about 190 mm. Hg at about 100 degrees centigrade, about one-half percent of calcium-phytate was added, and the mixture was steam-blown for about one hour at about 190 mm. Hg at about 100° C. Thereafter, for each example, the product was air-blown for about one hour at about 190 mm. Hg at about 100 degrees centigrade, about one percent of formamide was added to the product as a stabilizer, and the product was then analyzed by infrared spectroscopy.

It should be noted that the polycyclic sulfite and chlorendic ether are both soluble in both toluene and dioxene, but chlorendic diol is only soluble in large amounts dioxene. Therefore, when dioxene was employed as a solvent, the whole sample was treated, in contrast with the situation when toluene was employed as a solvent in which a chlorendic diol filter cake was left untreated. Maglite and activated carbon were removed in the following examples by filtration prior to reaction. The particular stabilizer employed and the results obtained thereby are illustrated in Table I below.

Examples 7, 8 and 9

In each of Examples 7, 8 and 9, upgraded thiodan prepared by the methods employed for the above Examples 2 and 3 were stored for a period of thirty days at about 90 degrees centigrade. The product was analyzed by infrared analysis both prior to the storage period and immediately thereafter. Example 9 represented a control. The results are shown in the following Table II.

TABLE II

| | | Infrared Analysis (Wt. precent) | | | | | |
|---|---|---|---|---|---|---|---|
| | | Polycyclic sulfite | | Chlorendic diol | | Chlorendic ether | |
| Example No. | Stabilizer present | Before storage | After storage | Before storage | After storage | Before storage | After storage |
| 7 | PCl$_3$ | 91 | 85 | 5 | 6 | 4 | 3 |
| 8 | PSCl$_3$ [1] | 94 | 95 | 2.5 | 2 | 3.5 | 9 |
| 9 | None | 96 | 86 | 1.2 | 1.5 | 3.7 | 11 |

[1] Each polycyclic sulfite product also contained 1% of a miscellaneous ingredient.

From the preceding Examples 7 and 8, as illustrated in Table II, the polycyclic sulfite containing a stabilizer of this invention exhibited a high degree of stability, and the PSCl$_3$ is the preferred stabilizer.

The mechanism of the "stabilizer" of this invention is not definitely ascertained, and the term "stabilizer" is merely a term employed for purposes of the description.

It should be noted that the illustrations in each of Tables I and II confirm the preferred stabilizing agent to be the phosphorus thionyl halide, preferably phosphorus thionyl trichloride.

It is within the scope of this invention to use equivalents within the skill of the art and to make such modifications as would be obvious to a person skilled in this art.

I claim:

1. A composition consisting essentially of a diol compound of the formula:

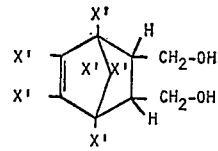

TABLE I

| Example No. | Stabilizer added | Infrared Analysis (Wt. percent) | | | | |
|---|---|---|---|---|---|---|
| | | Polycyclic sulfite | Chlorendic diol | Chlorendic ether | Total | Remarks |
| (The charge) | None | 80.7 | 17.0 | 2.1 | 99.8 | This is the degenerated polycyclic sulfite charged to Examples 1–6 (i.e., before reaction). |
| 1 | None | 82.7 | 1.0 | 15.3 | 99.0 | After steaming. |
| 2 | ½% PCl$_3$ | 92.8 | <1 | 5.1 | 97.9 | Do. |
| 3(a) | ½% PSCl$_3$ | 95.1 | <1 | 4.2 | 99.3 | Before steaming. |
| 3(b) | ½% PSCl$_3$ | 94.5 | 2.4 | 2.7 | 99.6 | After steaming. |
| 4 | Dioxane treated Maglite | 80.8 | 4.5 | 14.7 | 100.0 | Do. |
| 5 | Dioxane treated with activated carbon | 57.5 | 2.9 | 39.6 | 100.0 | Do. |
| 6 | The polycyclic sulfite extracted with toluene, isolated and steamed. | 83.8 | ([1]) | 10.5 | 94.3 | Do. |

[1] Not done.

From the above Examples 1–6, Example 1 served as the control for comparison of the product after steaming. Also, it is of interest to compare Example 3(a) before steaming with the charged degraded polycyclic sulfite reactant.

The results illustrated in Table I serve as conclusive evidence that each of the phosphorus trichloride and the phosphorus thiotrichloride are superior stabilizing agents, or catalysts, making possible an efficient upgrading of the degenerated polycylic sulfite.

in which X′ is halogen, and a phosphorus halide of the formula:

in which X$^2$ is a halogen, in which $a$ is zero or one, and in which $b$ is 3 or 5, provided that $b$ is 3, when $a$ is one, wherein said halogen and said halide is chlorine.

2. A composition according to claim 1 in which said X′ and said X$^2$ are each chlorine, and in which $b$ is 3.

3. A composition according to claim 1 including a thionyl halide.

4. A composition according to claim 3 in which said X', said X², and the halogen of said thionyl halide are each chlorine, and in which $a$ is one.

5. A composition according to claim 4 in which said thionyl chloride is in a diluent comprising toluene.

6. A process comprising heating a composition according to claim 1 in a diluent, with a thionyl halide at a temperature sufficiently high and for a period of time sufficiently extended to form a rection product comprising a composition of the formula:

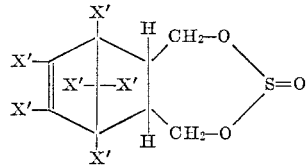

7. A process according to claim 6 in which said temperature ranges from about 100 degrees centigrade to about 115 degrees centigrade, in which X' and X² are each chlorine, in which said diluent comprises toluene, in which said thionyl halide is thionyl chloride present in an amount up to about fifty percent based on the weight of the diol compound, in which $a$ is one, and in which said phosphorus halide is present in an amount up to about 0.5% based on the weight of the diol compound.

8. A process according to claim 6, including steaming the reaction product.

9. A composition consisting essentially of (1) a compound of the formula:

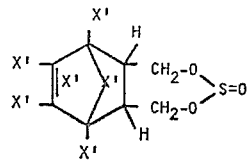

in which X' is a halogen, and (2) a member selected from the group consisting of (a) a phosphorus halide of the formula:

$$(S)_a=P(X^2)_b$$

in which X² is a halogen and in which $a$ is zero or one, and in which $b$ is 3 or 5, provided that $b$ is 3 when $a$ is one, and (b) a residue of said phosphorus halide, wherein said halogen and said halide is chlorine.

References Cited

FOREIGN PATENTS 23,414   1964   Japan.

JAMES A. PATTEN, Primary Examiner

U.S. Cl. X.R.

252—397; 260—346.2, 617; 424—276